United States Patent [19]
Boniort et al.

[11] Patent Number: 5,649,038
[45] Date of Patent: Jul. 15, 1997

[54] MULTIFERRULE FOR CONNECTING OPTICAL FIBERS TOGETHER, A CONNECTOR CONSTITUTING AN APPLICATION THEREOF, AND A METHOD OF MANUFACTURING THE MULTIFERRULE

[75] Inventors: Jean-Yves Boniort, Limours; Claude Brehm, Montrouge; André Tardy, Egly; Roland Hakoun, Domont; Jean-Francois Bourhis, Taverny; Bertrand Joly, Sevres, all of France

[73] Assignee: Alcatel Cable Interface, Vrigne aux Bois, France

[21] Appl. No.: 595,532

[22] Filed: Feb. 2, 1996

[30] Foreign Application Priority Data

Feb. 3, 1995 [FR] France .................. 95 01275

[51] Int. Cl.⁶ .................................. G02B 6/38
[52] U.S. Cl. .................. 385/59; 385/43; 385/65; 385/71
[58] Field of Search ............... 385/43, 59, 60, 385/65, 71

[56] References Cited

U.S. PATENT DOCUMENTS

| Re. 35,138 | 1/1996 | Weldman | 385/43 |
| 5,183,489 | 2/1993 | Brehm et al. | 65/4.2 |
| 5,274,724 | 12/1993 | Brehm et al. | 385/95 |
| 5,400,421 | 3/1995 | Takahashi | 385/43 |
| 5,550,943 | 8/1996 | Elderstig et al. | 385/71 |

FOREIGN PATENT DOCUMENTS

| 0001278A1 | 4/1979 | European Pat. Off. | 385/55 |
| 0213856A2 | 3/1987 | European Pat. Off. | 385/34 |
| 0484850A1 | 5/1992 | European Pat. Off. | 385/55 |
| 2486086 | 1/1982 | France . | |
| 4102459A1 | 7/1992 | Germany | 385/34 |

*Primary Examiner*—John D. Lee
*Assistant Examiner*—Ellen Eunjoo Kang
*Attorney, Agent, or Firm*—Sughrue, Mion, Zinn, Macpeak & Seas

[57] ABSTRACT

The multiferrule for connecting optical fibers together has a series of internal capillary channels of transverse dimensions that are defined to leave substantial clearance for the fibers, at least in the two end portions of the channels where they open out into two end faces of the multiferrule. The multiferrule further includes middle necking in which the corresponding middle portions of the channels have their transverse dimensions reduced so as to leave only minimal clearance for the fibers, to enable them to be put into contact and connected together directly in this location. The multiferrule is applicable to making an optical fiber connector.

10 Claims, 1 Drawing Sheet

MULTIFERRULE FOR CONNECTING OPTICAL FIBERS TOGETHER, A CONNECTOR CONSTITUTING AN APPLICATION THEREOF, AND A METHOD OF MANUFACTURING THE MULTIFERRULE

The present invention relates to a multiferrule for connecting optical fibers together, in particular two flat ribbon cables, each comprising a plurality of optical fibers, the invention also relates to a connector resulting therefrom and to a method of manufacturing the multiferrule.

BACKGROUND OF THE INVENTION

Document FR-A-2 669 119 describes a method of manufacturing a multiferrule out of vitreous material, the multiferrule being of the type comprising a series of parallel internal capillary channels.

Such a multiferrule is constituted by a length taken from a component of greater length, itself obtained in a fiber-drawing installation by drawing down a corresponding geometrically similar primary blank.

Document FR-A-2 674 341 describes a method of splicing together two optical fiber cables by using a glass multiferrule of the above-specified type. In that method, the stripped ends of each pair of fibers are threaded into the opposite ends of a corresponding channel, they are advanced substantially as far as the middle portion of the multiferrule, and they are locked in place inside the channel. The multiferrule is then sectioned transversely to the locked fibers to obtain two end lengths that are secured to the respective cables, and a middle length is discarded. Thereafter, splicing is performed by connecting together the two end lengths. Advantageously, a refractive index matching gel is used at the splice interface.

To facilitate sectioning the multiferrule, two grooves extending transversely to the channels are initially machined at respective ends of the middle portion, with the bottoms of the grooves opening out into the channels.

It is easier to advance the fibers in each pair of fibers along the channel receiving them when the clearance provided for the fibers in the channel is relatively large. Unfortunately, such large clearance does not make it possible to obtain accurate optical alignment of the two fibers locked in their channel. This can be compensated by taking advantage of the existing pair of transverse grooves provided specifically for sectioning the multiferrule, since they give access to both of the fibers inserted in the channel, thus making it possible to press the two fibers down against the bottom of the channel before they are locked in place, thereby ensuring that they are optically aligned.

Those various operations for connecting together two optical fiber cables are lengthy and difficult, and they do not always give rise to a satisfactory optical connection.

OBJECTS AND SUMMARY OF THE INVENTION

An object of the present invention is to provide a multiferrule that avoids the above-specified operations and that enables an optically satisfactory connection to be obtained between optical fiber cables.

The invention provides an elongate multiferrule for connecting optical fibers together, the multiferrule including a substantially coplanar series of parallel longitudinally-extending internal capillary channels, and in which each channel has end portions that open out in two opposite end faces of the multiferrule, for the purpose of receiving, via its respective ends, two of said fibers that are to be connected together, and having transverse dimensions, at least in its end portions, defined to leave substantial clearance for the fibers, the multiferrule further including a middle zone of necking in which the corresponding middle portions of said channels have reduced transverse dimensions leaving only minimal clearance for the fibers, to enable two fibers received in each channel to be put into contact and connected directly one to the other.

Preferably, and also:

the necking is progressive, extending symmetrically between the end portions of the multiferrule and over a length of at least 10 mm; and the capillary channels are triangular in section, are open lengthwise to communicate with one another, and are defined by a series of V-grooves associated with a single rectangular groove facing the series of V-grooves.

The invention also provides a connector constituting an application of the multiferrule, and including a pair of fibers inserted into each channel, wherein said fibers in each pair are disposed in end-to-end contact in said middle portion of the channel receiving them, and the connector further includes means for locking the fibers in place.

Advantageously, the connector further includes a gel serving to match the refractive indices of the fibers in each pair at their contact interface.

The invention also provides a method of manufacturing the multiferrule, consisting in drawing down a "primary" preform in a fiber-drawing installation to make a long component of transverse dimensions and shape that are uniform along its entire length and identical to those of the end portions of said multiferrule, said component and said primary preform being geometrically similar to each other, and in sectioning a defined length of said component to obtain an initial multiferrule, the method further consisting in heating a middle zone of said initial multiferrule via its periphery, and in stretching said initial multiferrule while monitoring its elongation in order to obtain said necking.

Preferably, the method consists in defining the transverse dimensions of the channels of said initial multiferrule to obtain said substantial clearance which has a value of not less than 10 microns, in heating said middle zone of the initial multiferrule over a length substantially equal to 20 millimeters, and in stretching said initial multiferrule so that its elongation is substantially 1.6 mm.

BRIEF DESCRIPTION OF THE DRAWINGS

The characteristics and advantages of the present invention appear from the following description of a preferred embodiment given by way of example and shown in the accompanying drawing. In the drawing.

MORE DETAILED DESCRIPTION

Figure 1:
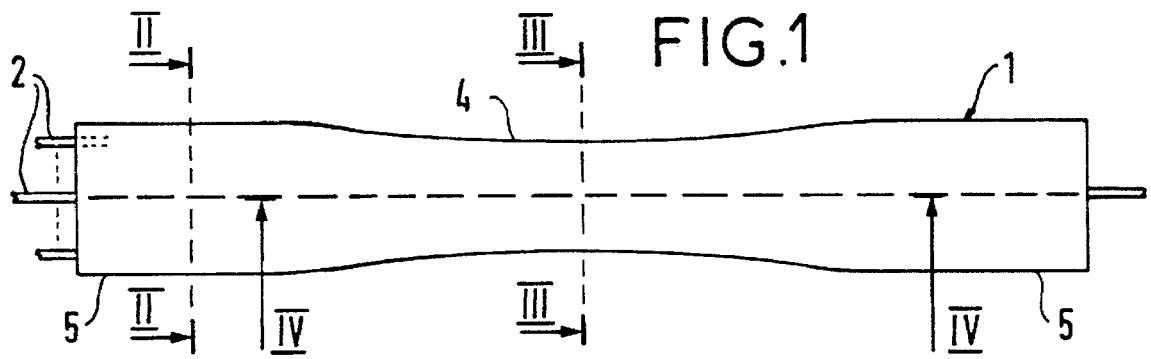
FIG. 1 is an elevation view of a multiferrule of the invention for connecting optical fibers together.

FIGS. 1 to 4 show a multiferrule 1 of glass or of vitreous material in which optical fibers 2 are connected together.

These optical fibers come from two cables (not shown) and in particular two flat cables in the form of respective ribbons, each including a plurality of monomode optical fibers.

The multiferrule has a series of internal capillary channels 3 that are parallel and substantially coplanar, a zone of necking 4 extending over its middle portion and affecting the internal channels in said middle portion, and two end portions 5 situated on either side of the necking in the middle portion.

The channels open out in opposite end faces of the multiferrule and each channel receives a pair of fibers 2 to be connected together.

In the two end portions 5 of the multiferrule, the channels are designed to leave a considerable amount of clearance relative to the stripped fibers in order to make it easy to advance the fibers in these portions. In the necking 4 of the middle portion, the channels are of section that tapers progressively and symmetrically away from the end portions 5, thereby making it possible to obtain accurate optical alignment of the axes of the fibers which are brought into end-to-end contact in the central connection zone c of the middle portion of the multiferrule. This accurate optical alignment is thus achieved with tolerance of the order of one micrometer, or even less.

The channels 3 are open longitudinally so as to communicate with one another via longitudinal openings 6. They are also preferably defined firstly by a series of V-grooves 7 situated side by side and secondly by a single wide and shallow rectangular groove 8 situated facing the series of grooves 7. The rectangular groove, or more precisely the bottom thereof, faces the openings of the V-grooves 7 and constitutes a plane ceiling for the V-grooves, which ceiling is given the same reference 8 below. The width of the rectangular groove is slightly greater than the width of the entire series of V-grooves 7, so it extends beyond both sides of said series of V-grooves.

The channels 3 defined in this way are the result of machining two initial parts which are subsequently assembled together, and which correspond to two halves 11 and 12 of the multiferrule 1. In the multiferrule 1, these two halves 11 and 12 are no longer separable and can be considered as constituting a single whole.

Figure 2:
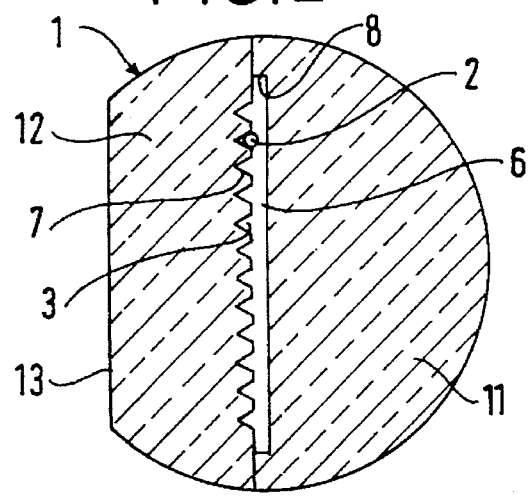
FIGS. 2 and 3 are two cross-section views of a larger scale on lines II—II and III—III of FIG. 1.
Figure 3:
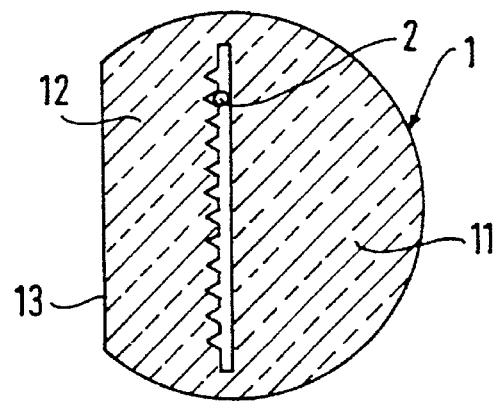

In the embodiment shown, it can be seen in FIGS. 2 and 3 that the multiferrule has twelve capillary channels 13 to enable two cables each having twelve or fewer optical fibers to be connected together, but it would naturally be possible for a multiferrule to have some other number of channels.

In the end portions, these channels 3 are spaced apart with the same spacing as the sheathed optical fibers they receive. They are provided at the same pitch as the sheathed fibers in each ribbon cable.

FIGS. 2 and 3 also show that the right cross-section of the multiferrule is approximately semicircular, having a flat 13 on the "bottom" half 12. The sections of FIGS. 2 and 3 differ in that one of them is situated in one of the end portions while the other is situated in the necking.

The flat 13 is parallel to the series of V-grooves 7 provided in the bottom half 12. It constitutes a base for the multiferrule so as to enable it to positioned stably on a plane work surface. Naturally, the outside shape of the multiferrule could be different.

Although not shown in FIG. 1, it is also mentioned that the multiferrule 1 advantageously presents shoulders on its end faces, defining on each of them, respective surfaces for pressing against and locking in place fibers that are sheathed.

Such a surface for engaging sheathed fibers is offset relative to the plane in which the stripped fibers are held within the V-grooves 7 by a distance that is substantially equal to the thickness of the fiber sheaths.

Figure 4:
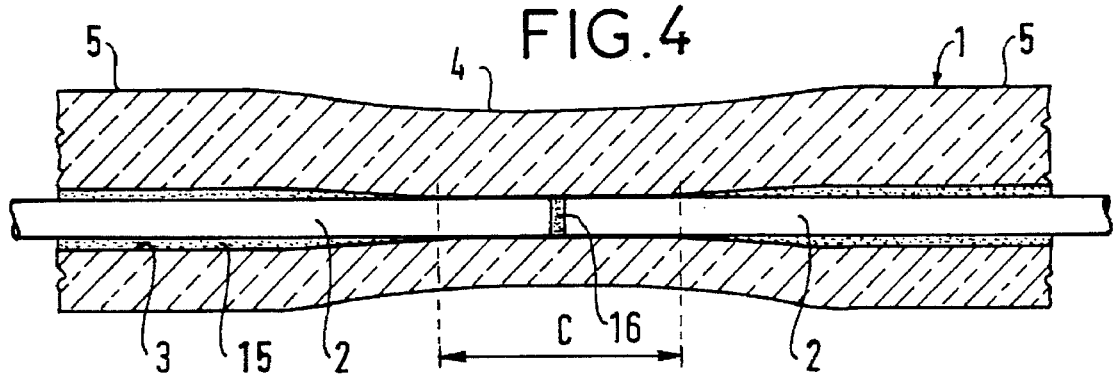
FIG. 4 is a longitudinal section view of line IV—IV of FIG. 1, showing how a pair of fibers are spliced together.

The pairs of fibers are connected together by splicing directly in the multiferrule 1, as shown in FIG. 4. For this purpose, the two fibers in each pair are brought end-to-end in the central connection zone c. They are locked in place by appropriate means 15 such as adhesive, which holds the sheathed fibers pressed against the surfaces provided therefor on the two end faces, and holds the stripped fibers in place in each channel, at least in the end portions of each channel.

When the fibers are locked in place by means of adhesive, the adhesive is preferably a low-viscosity adhesive that can be polymerized by being exposed to ultraviolet rays. It is applied to the shouldered end faces of the multiferrule, from which it spreads into the channels, and it is polymerized by being exposed to ultraviolet light.

Advantageously, a gel 16 is also provided at the connection interfaces of the fibers for refractive index matching purposes. The gel may be placed on the leading end of one or both of the fibers in a pair, prior to the fibers being inserted in the channel. In a variant, the gel may be deposited on one of the ends of the channels in which the fibers have already been placed but not yet locked in place, and can then be blown from said end or sucked from the other end of the channels prior to the fibers being locked in place. Small displacements of one of the two sets of fibers to move the two sets apart and then back into contact within the connection zone helps make the gel penetrate into the contact interface of the fibers.

The triangular section of each channel defines support with considerable clearance 6 for the two fibers of the same pair in each channel, the respective fibers being supported at three equidistant points around their peripheries in the two end portions of the channel. In contrast, the triangular section defines contact with practically no clearance for the same two fibers in the connection zone of the channel. The longitudinal openings 6 of the channels make it possible for the second fibers to be advanced along the channels as far as the connection zone even after the first fibers have already been put into place therein, because the openings constitute the vents necessary for making such advance possible and for allowing the second fibers to be brought into contact with the respective first fibers in the connection zone.

It is specified that the clearance allowed for each stripped fiber in an end portion of a channel 3 is less than 10 microns whereas it is of the order or less than 1 micron in the central portion of the connection zone.

It is also specified that in their end portions 5, the V-grooves 7 have an angle at the apex which is substantially equal to 70°, and that they are at a pitch of 250 microns for fibers having a diameter of 250 microns when sheathed and a diameter of 125 microns when stripped.

Figure 5:
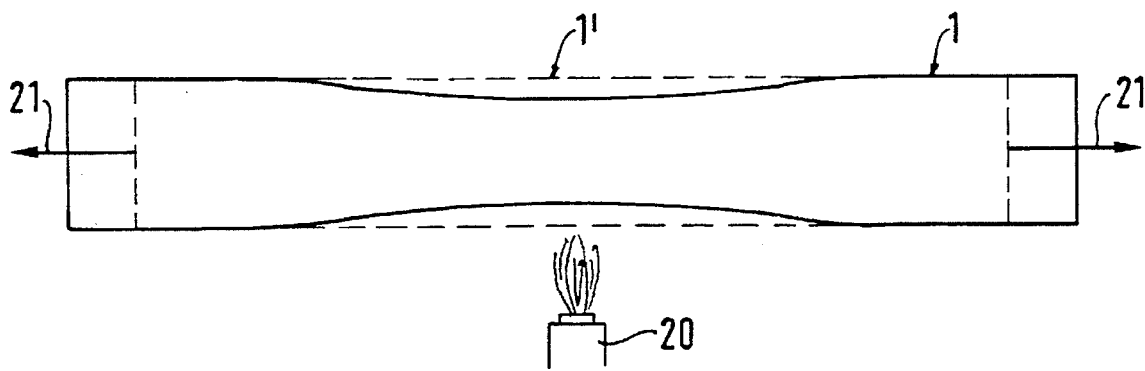
FIG. 5 is an elevation view showing the method of manufacturing the multiferrule of FIG. 4.

FIG. 5 shows a method of manufacturing the multiferrule 1, or more precisely, it shows solely the final step of the method, since the preliminary steps are known in themselves and are therefore referred to only briefly.

The preliminary steps consist in making an initial multiferrule 1' which is represented by dashed lines. This non-final multiferrule is made from a primary preform or blank by drawing the preform down in a fiber-drawing installation so as to obtain a long component which is then sectioned to obtain a defined short length. The preform is cylindrical or semicylindrical and is itself the result of assembling together two initial halves which are previously machined so as to obtain the internal capillary channels and the optional flat of the multiferrule 1'. Such a preform may have a diameter of 40 mm, for example, and it is drawn down to constitute a single component having a diameter of about 4 mm, which component is then sectioned to obtain the initial multiferrule 1'. The minimum length for the initial multiferrule 1' is preferably about 30 mm.

According to the invention, the final step of the method of manufacturing the multiferrule 1 consists in locally heating the initial multiferrule 1' and in stretching it in controlled manner to obtain the necking 4. The necking should occupy a length of at least 10 mm of the multiferrule 1.

The zone of the multiferrule 1' which is subjected to heating should extend over about 20 mm.

Heating is provided by the flame of a torch 20 applied to the periphery of the initial multiferrule, but not to its end portions so as to avoid deforming its end portions.

The parameter monitored during this final step is the elongation of the multiferrule 1' while it is being stretched, as symbolized by opposite arrows 21. This elongation is accurately measured by means of an extensometer (not shown). To obtain the design clearance of 10 microns around stripped fibers in the channels, starting from the channels of the initial multiferrule which are calibrated to better than 100 microns, and for a heated zone that is 20 mm long, the stretching elongation of the initial multiferrule is about 1.6 mm. That elongation shrinks the calibrated channels by about 8% which makes it possible to obtain fiber positioning accuracy of better than 1 micron.

With reference to the resulting multiferrule 1, it may be observed that the necking 4 implies that the shape of the section concerned is shrunk in all directions. This means that the fibers in the outermost channels will be subjected to a small amount of curvature in the central connection zone so that the end faces of these fibers will not be accurately in the same plane. That is why the necking is performed over a relatively long length, preferably greater than 10 mm, of the multiferrule. Such a long length makes stretching easier, makes it possible to monitor the resulting elongation accurately, and serves to minimize such curvature of the fibers furthest from the axis of the multiferrule, and thus to minimize the resulting dispersion.

The multiferrule 1 provided with such necking enables optical fibers to be connected together directly in its capillary channels, without requiring any measures to be taken to compensate for clearance which is designed to be minimal in the connection zone only, and without requiring any other prior or subsequent operations as used to be necessary with multiferrules not including necking.

We claim:

1. An elongate multiferrule for connecting optical fibers together, the multiferrule including a substantially coplanar series of parallel longitudinally-extending internal capillary channels, and in which each channel has end portions that open out in two opposite end faces of the multiferrule, for the purpose of receiving, via its respective ends, two of said fibers that are to be connected together, and having transverse dimensions, at least in its end portions, defined to leave substantial clearance for the fibers, the multiferrule further including a middle zone of necking in which the corresponding middle portions of said channels have reduced transverse dimensions leaving only minimal clearance for the fibers, to enable two fibers received in each channel to be put into contact and connected directly one to the other.

2. A multiferrule according to claim 1, wherein said necking is progressive and extends symmetrically between the opposite end portions of said multiferrule.

3. A multiferrule according to claim 2, wherein said necking extends over a length of not less than 10 mm.

4. A multiferrule according to claim 1, wherein said capillary channels are of triangular right section, and have longitudinally-extending openings providing communication between channels.

5. A multiferrule according to claim 4, wherein said series of channels is constituted firstly by a series of V-grooves situated side by side and secondly by a single rectangular groove situated facing said series of V-grooves, extending over a width at least as great as the width of the series of V-grooves, and forming a plane ceiling thereover.

6. A multiferrule according to claim 5, wherein said V-grooves have an angle at the apex of the order of 70°.

7. A connector constituting an application of the multiferrule according to claim 1, and including a pair of fibers inserted into each channel, wherein said fibers in each pair are disposed in end-to-end contact in said middle portion of the channel receiving them, and the connector further includes means for locking the fibers in place.

8. A connector according to claim 7, further including a gel serving to match the refractive indices of the fibers in each pair at their contact interface.

9. A method of manufacturing the multiferrule according to claim 1, consisting in drawing down a "primary" preform in a fiber-drawing installation to make a long component of transverse dimensions and shape that are uniform along its entire length and identical to those of the end portions of said multiferrule, said component and said primary preform being geometrically similar to each other, and in sectioning a defined length of said component to obtain an initial multiferrule, the method further consisting in heating a middle zone of said initial multiferrule via its periphery, and in stretching said initial multiferrule while monitoring its elongation in order to obtain said necking.

10. A method according to claim 9, consisting in defining the transverse dimensions of the channels of said initial multiferrule to obtain said substantial clearance which has a value of not less than 10 microns, in heating said middle zone of the initial multiferrule over a length substantially equal to 20 millimeters, and in stretching said initial multiferrule so that its elongation is substantially 1.6 mm.

* * * * *